(12) United States Patent
Zimmerman et al.

(10) Patent No.: US 7,533,204 B2
(45) Date of Patent: May 12, 2009

(54) ENUMERATION OF DEVICES ON A MEMORY CHANNEL

(75) Inventors: David Zimmerman, El Dorado Hills, CA (US); Jun Shi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 166 days.

(21) Appl. No.: 11/648,482

(22) Filed: Dec. 28, 2006

(65) Prior Publication Data

US 2008/0162733 A1    Jul. 3, 2008

(51) Int. Cl.
*G06F 13/00* (2006.01)

(52) U.S. Cl. .................. 710/104; 710/10; 711/170; 365/230.03

(58) Field of Classification Search ............... 710/8–10, 710/14, 104; 711/1, 170; 365/63, 230.01, 365/230.03
See application file for complete search history.

(56) References Cited

U.S. PATENT DOCUMENTS

2008/0002336 A1* 1/2008 Zimmerman et al. ........ 361/600
2008/0034130 A1* 2/2008 Perego et al. ................. 710/23

* cited by examiner

*Primary Examiner*—Glenn A Auve
(74) *Attorney, Agent, or Firm*—Blakely, Sokoloff, Taylor & Zafman LLP

(57) ABSTRACT

According to one embodiment, a method is disclosed. The method includes receiving a bit pattern value at a first memory device from a host device via an interface to establish a first sideband address and the first memory device receiving a unique device identification (ID) from the host device.

19 Claims, 4 Drawing Sheets

ENUMERATION OF DEVICES ON A MEMORY CHANNEL

FIELD OF THE INVENTION

The present invention relates to computer systems; more particularly, the present invention relates to memory devices.

BACKGROUND

A dual in-line memory module (DIMM) is a series of random access memory (RAM) integrated circuits mounted on a printed circuit board and designed for use in personal computer systems. A DIMM typically includes a number of independent sets (or ranks) of dynamic RAMs (DRAMs) that can be accessed simultaneously for a full data bit-width of the DIMM to be driven on an input/output (I/O) bus. However, each of the DRAMs within a DIMM is to have a unique ID.

The DRAM devices within a DIMM include a small number of configuration registers. These registers include key information, such as the desired operating speed of the DRAM. In a conventional memory system these registers are accessed simultaneously and are "write-only". In more advanced memory systems, such as fully-buffered DIMM, there are several memory buffer devices, each with a larger number of registers and read/write access to those registers. Applications such as these require that each buffer chip or DRAM device, have a unique identifier, or address so the registers on that device can be read independently of other devices.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A mechanism for addressing devices on memory channel is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
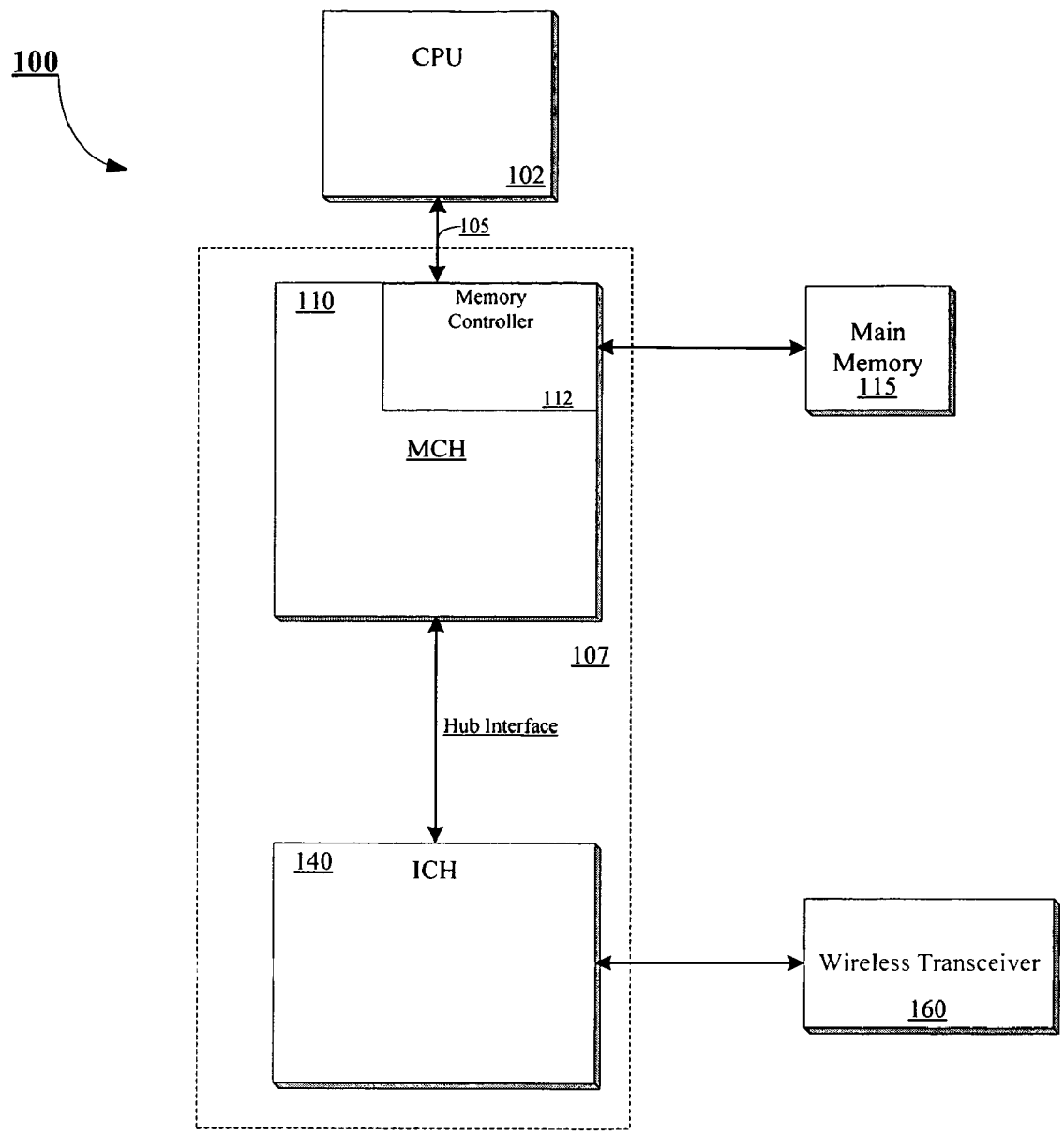
FIG. 1 is a block diagram of one embodiment of a computer system.

FIG. 1 is a block diagram of one embodiment of a computer system 100. Computer system 100 includes a central processing unit (CPU) 102 coupled to interconnect 105. In one embodiment, CPU 102 is a processor in the Pentium® family of processors available from Intel Corporation of Santa Clara, Calif. Alternatively, other CPUs may be used. For instance, CPU 102 may be implemented as multiple processors, or multiple processor cores.

In a further embodiment, a chipset 107 is also coupled to interconnect 105. Chipset 107 may include a memory control hub (MCH) 110. MCH 110 may include a memory controller 112 that is coupled to a main system memory 115. Main system memory 115 stores data and sequences of instructions that are executed by CPU 102 or any other device included in system 100.

In one embodiment, main system memory 115 includes one or more DIMMs incorporating dynamic random access memory (DRAM) devices; however, main system memory 115 may be implemented using other memory types. Additional devices may also be coupled to interconnect 105, such as multiple CPUs and/or multiple system memories.

MCH 110 may be coupled to an input/output control hub (ICH) 140 via a hub interface. ICH 140 provides an interface to input/output (I/O) devices within computer system 100. ICH 140 may support standard I/O operations on I/O interconnects such as peripheral component interconnect (PCI), accelerated graphics port (AGP), universal serial interconnect (USB), low pin count (LPC) interconnect, or any other kind of I/O interconnect (not shown). In one embodiment, ICH 140 is coupled to a wireless transceiver 160.

Figure 6:
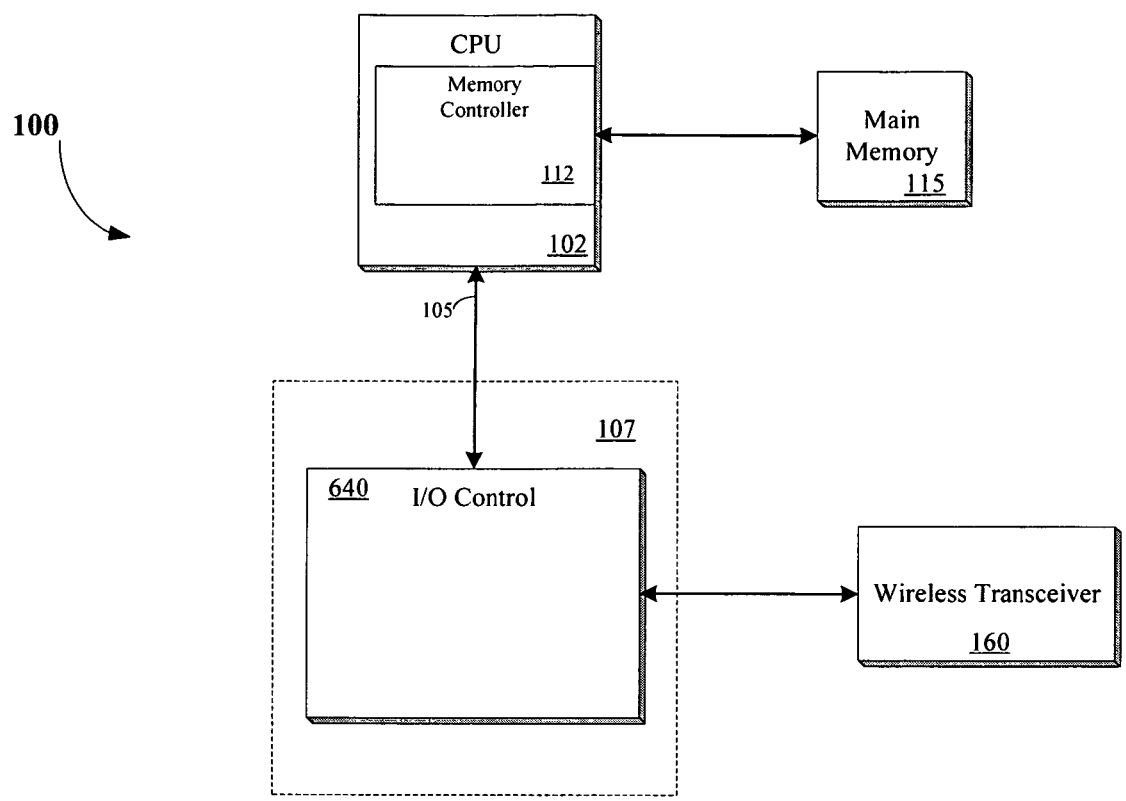
FIG. 6 is a block diagram of another embodiment of a computer system.

FIG. 6 illustrates another embodiment of computer system 100. In this embodiment, memory controller 112 is included within CPU 102. As a result, memory 115 is coupled to CPU 102. Further chipset 107 includes a control hub 640.

According to one embodiment, memory controller 112 transmits a unique address to each device within main memory 115 upon computer system 100 being powered up. In a further embodiment, memory device 115 uses existing pins to receive the unique address identifications (IDs). These pins, in conjunction with a command on a common interface between memory controller 112 and memory device 115 are used to assign the unique IDs.

Figure 2:
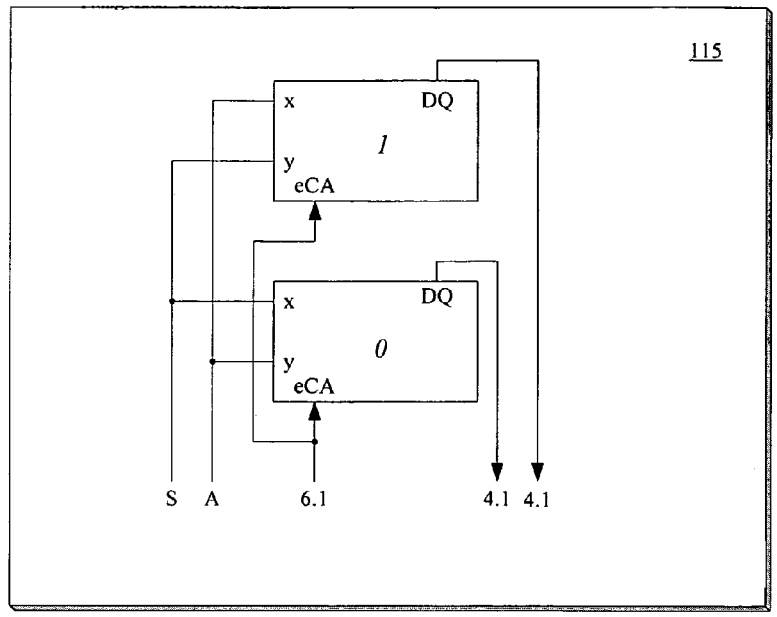
FIG. 2 illustrates one embodiment of a memory device.

FIG. 2 illustrates one embodiment of memory device 115. Memory device 115 includes two DRAM devices (0 and 1), each having an eCA input and two pins to receive a two-wire sideband interface. These pins are sideband and alert, which form a sideband interface between memory controller 112 and memory device 115. In one embodiment, sideband and alert I/O drivers are implemented as identical and interchangeable pins.

Typically all DRAM inputs are tied together, making it impossible to distinguish between two connected DRAMs. Thus in one embodiment, the sideband and alert pins are swapped between DRAMs. In such an embodiment, the swapping is enforced by DIMM design or package stacking. Swapping of sideband and alert pins is illustrated in FIG. 2, where sideband is connected to an "x" pin on device 0 and the "y" pin on device 1. Similarly, alert is connected to "y" pin on device 0 and "x" pin on device 1.

According to one embodiment, a DRAM will determine which way it is oriented after power on. Such a determination is made by examining the states of sideband and alert. By default sideband and alert will both be low, in which case the DRAM will wait for orientation information. To establish orientation, in one embodiment, memory controller 112 will pull sideband high and leave alert low. The DRAM devices 0 and 1 will use this information to set an orientation bit and establish direction for the sideband I/Os.

Thus, device 0 observes a "10" at the "xy" pins, which indicates normal orientation. Meanwhile, device 1 observes a "01" at the "xy" pins, indicating a rotated orientation. By establishing orientation for devices, a particular device will know whether the device is in the front or back of a stacked DIMM assembly. In one embodiment, the orientation determination happens quickly, after which memory controller 112 can return sideband to the idle (low) state. With orientation established the DRAM devices will be up and running at the default sideband address of zero.

In one or two rank systems, the orientation bit corresponds to a group of devices, such as devices on one side of a double-sided assembly. In such an assembly, the group of devices may share one sideband address. Within the group, each DRAM will have a unique device ID. According to one embodiment, the DRAM devices and memory controller 112 power up with an eCA interface operating in a low speed mode.

In a further embodiment, memory controller 112 drives a unique bit pattern on each copy of eCA to assign a sideband address. In still a further embodiment, memory controller 112 issues a SetAddress( ) command to address zero on the sideband bus. On receipt of the SetAddress( ) command, the DRAM device will sample its primary eCA inputs. In one embodiment, if eCA is all ones the DRAM device does nothing. Otherwise, the DRAM device takes the eCA value, combined with the orientation bit, as its sideband address.

After setting eCA addresses, the DRAM devices closest to memory controller 112 will have unique sideband addresses. In one embodiment DRAM devices may connect to additional DRAM devices in a "cascaded" configuration. Furthermore the cascaded devices may receive an address from the preceding device in the chain. By default this address may consist of all one's, such that a SetAddress( ) command will be ignored. Therefore the DRAM devices on cascaded eCAs will remain at address zero. Memory controller 112 subsequently writes unique addresses to the force a unique bit pattern on the eCA bus of the first group of DRAM devices. The DRAM devices will then drive the secondary eCA transmitters accordingly. Memory controller 112 then re-issues the SetAddress( ) command to address zero. The cascaded DRAMs will sample eCA and the orientation bit to assume unique addresses. This process can be repeated as many times as needed.

As discussed above, sideband addresses correspond to groups of devices. Thus in one embodiment, within a group each DRAM device is assigned a unique addresses sub-field (e.g., the "device" field in a register read/write message). After sideband address assignment, memory controller 112 writes to the internal registers of each DRAM. The memory controller may also read from a DRAM to determine the current state of operation.

Figure 3:
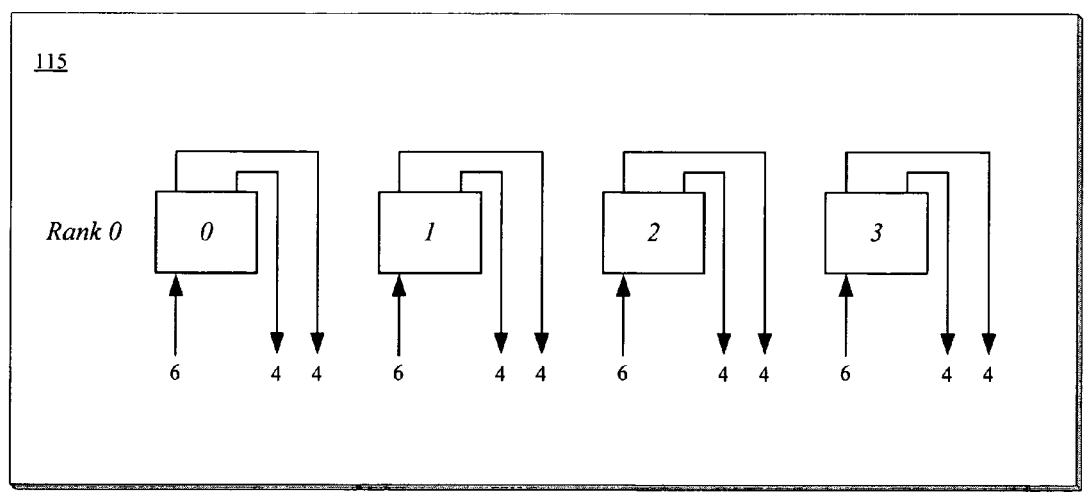
FIG. 3 illustrates another embodiment of a memory device.

Referring to FIG. 3 illustrates one embodiment of a single rank 4 device DIMM memory 115. As shown in FIG. 3, a single rank 4 device DIMM uses one sideband address. Memory controller 112 assigns a different device ID to each DRAM. In this embodiment, device IDs are assigned in increasing order from left to right. In addition, the memory controller 112 sets the DRAM rank ID bits to zero and the operating mode to x8 for such an embodiment.

Figure 4:
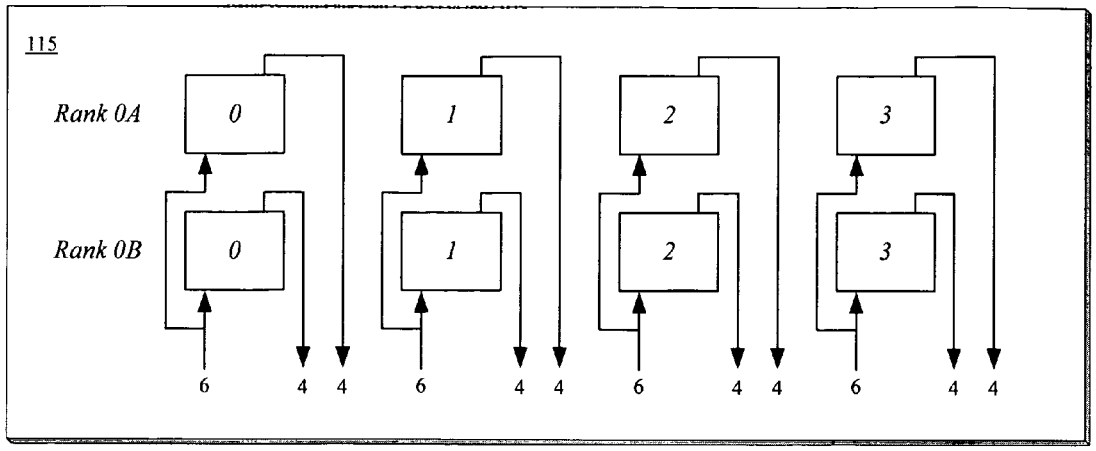
FIG. 4 illustrates yet another embodiment of a memory device.

FIG. 4 illustrates one embodiment of a single rank 8 device DIMM memory 115. In such an embodiment a sideband address may be shared by a group of 4 devices, such that the DRAM devices share the same sideband address, but will have unique device IDs. The second group of 4 devices may share a second sideband address. Although the two groups of devices have a common connection to the memory controller, the sideband pins are swapped such that when the controller assigns an address, the resulting sideband address differs by one bit from group 0 to group 1. Rank ID bits are programmed to zero, and the operating mode is set to x4. Further, nibble select bits will be set to the lower nibble for DRAMs in rank 0A and upper nibble for DRAMs in rank 0B.

Figure 5:
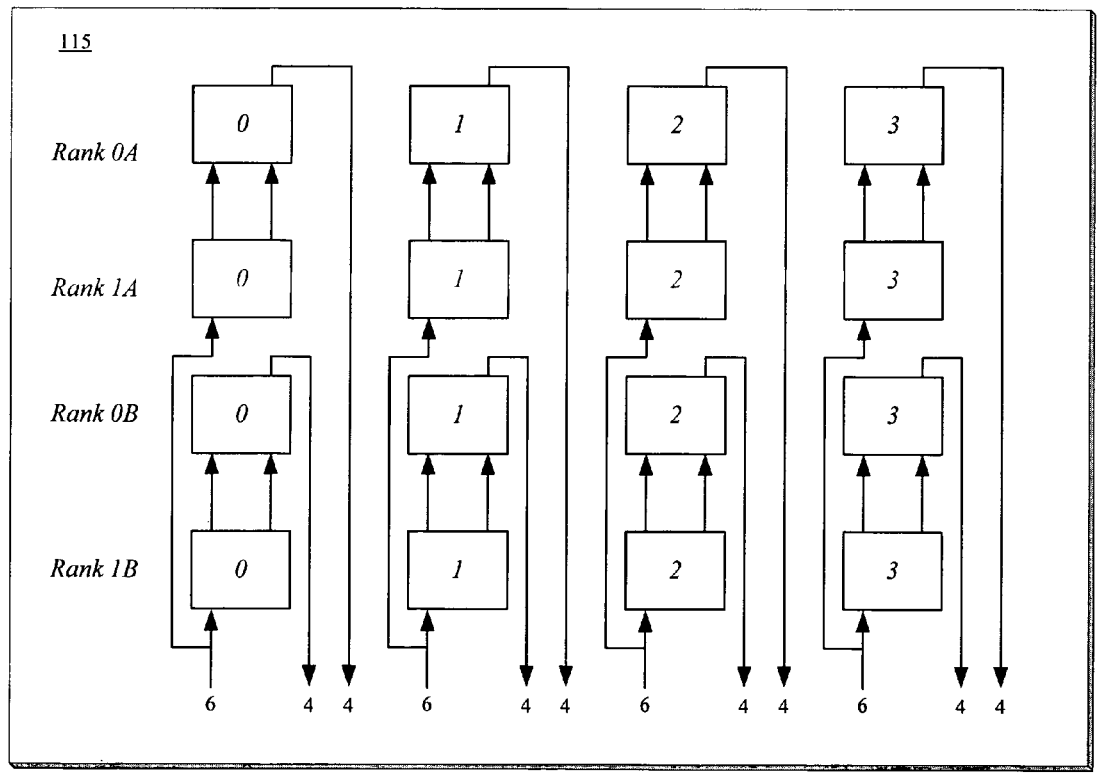
FIG. 5 illustrates still another embodiment of a memory device.

FIG. 5 illustrates one embodiment of a two-rank 16 device DIMM memory device 115. For the 16 device configuration in, rank0 uses two sideband address and rank 1 uses two more address. Each DRAM has a unique device ID within its group. All DRAMs are programmed in x4 mode with nibble select bits set in a manner similar to the 8 device DIMM discussed above. Moreover, the eCA repeater ports of DRAMs in rank 0 and the DQ repeater ports of DRAMs in rank 1 are enabled.

In some cases it is desirable to send common configuration information to all devices on a channel or to groups of devices. In one embodiment, common configuration information may be written to all devices prior to enumeration. This may be accomplished by writing to sideband address zero. An embodiment may also reserve a device ID for "broadcast" commands such that a register write to that device ID will be interpreted by all DRAMs at a given sideband address.

The above-described mechanism uses existing pins to receive a unique address from a system host controller, which is used to assign unique IDs for DRAM devices. Thus, the increased complexity of having to implement additional configuration pins in a DIMM package is averted.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
    writing common information to all memory devices coupled to a host device prior to enumeration;
    receiving a bit pattern value at a first memory device from the host device via an interface to establish a first sideband address; and
    the first memory device receiving a unique device identification (ID) from the host device.

2. The method of claim 1 further comprising:
    receiving the bit pattern value at a second memory device from the host device via the interface to establish the first sideband address; and
    the second memory device receiving a second unique device ID from the host device.

3. The method of claim 2 further comprising:
    receiving an orientation value at first and second pins of the first memory device from the host device via a sideband interface; and
    combining the orientation value with the bit pattern value to establish the first sideband address for the first memory device.

4. The method of claim 3 further comprising:
    receiving the orientation value at first and second pins of the second memory device sharing an input with the first memory device via the sideband interface; and
    combining the orientation value with the bit pattern value to establish a first rank address for the second memory device.

5. The method of claim 4 wherein the first and second pins of the second memory device are inverted from the first and second pins of the first memory device.

6. The method of claim 4 further comprising:
receiving a second bit pattern value at a third memory device from a host device via the interface to establish a second rank address; and
the third memory device receiving a third unique device identification (ID) from the host device.

7. The method of claim 2 wherein receiving the unique IDs at the first and second memory devices from the host device comprises:
receiving a rank ID;
receiving an operating mode;
receiving nibble bits; and
receiving other operating parameters.

8. The method of claim 1 wherein receiving the sideband address and unique IDs at the first memory devices from the host device allows reading or writing registers internal to the first memory device.

9. The method of claim 1 wherein the common information is written to all devices at a sideband address by using a pre-defined broadcast address.

10. The method of claim 1 further comprising:
receiving the bit pattern value at a second memory device from the first memory device to establish the first sideband address; and
receiving an orientation value at the second memory device from the first memory device.

11. A system comprising:
a memory controller; and
a dual in-line memory module (DIMM) coupled to the memory controller via a side band interface and a second interface, including a first memory device to receive a bit pattern value from the memory controller via the second interface to establish a first sideband address and to receive a unique device identification (ID) from the memory controller, wherein common information is written to all memory devices in the DIMM prior to enumeration.

12. The system of claim 11 wherein the DIMM further comprises a second memory device to receive the bit pattern value from the memory controller via the second interface to establish the a first rank address and to receive a second unique device identification (ID) from the memory controller.

13. The system of claim 12 wherein the first and second memory devices each comprise first and second pins to receive an orientation value from the memory controller via the sideband interface.

14. The system of claim 13 wherein the first and second pins of the second memory device are inverted from the first and second pins of the first memory device.

15. The system of claim 14 wherein the first and second memory devices combine the orientation value with the bit pattern value to establish the first sideband address.

16. A dual in-line memory module (DIMM) comprising:
a first memory device to receive a bit pattern value from a host device via an interface to establish a first sideband address and to receive a unique device identification (ID) from the host device; and
a second memory device to receive the bit pattern value from the host device via a second interface to establish the first sideband address and to receive a second unique device identification (ID) from the host device,
wherein common information is written to the first and second memory devices prior to enumeration.

17. The DIMM of claim 16 wherein the first and second memory devices each comprise first and second pins to receive an orientation value from the host device via the first and second interfaces.

18. The system of claim 17 wherein the first and second pins of the second memory device are inverted from the first and second pins of the first memory device.

19. The DIMM of claim 18 wherein the first and second memory devices combine the orientation value with the bit pattern value to establish the first sideband address.

* * * * *